United States Patent
Ito (10) Patent No.: US 12,103,848 B2
(45) Date of Patent: Oct. 1, 2024

(54) METHOD FOR PRODUCING SULFIDE SOLID ELECTROLYTE

(71) Applicant: MITSUBISHI GAS CHEMICAL COMPANY, INC., Tokyo (JP)

(72) Inventor: Tomohiro Ito, Niigata (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 590 days.

(21) Appl. No.: 17/434,876

(22) PCT Filed: Feb. 25, 2020

(86) PCT No.: PCT/JP2020/007280
§ 371 (c)(1),
(2) Date: Aug. 30, 2021

(87) PCT Pub. No.: WO2020/179523
PCT Pub. Date: Sep. 10, 2020

(65) Prior Publication Data
US 2022/0169509 A1    Jun. 2, 2022

(30) Foreign Application Priority Data
Mar. 5, 2019   (JP) ................................ 2019-039496

(51) Int. Cl.
  *C01B 25/14*   (2006.01)
  *H01M 10/0562*   (2010.01)

(52) U.S. Cl.
  CPC ......... *C01B 25/14* (2013.01); *H01M 10/0562* (2013.01); *C01P 2002/72* (2013.01); *C01P 2006/40* (2013.01); *H01M 2300/0068* (2013.01)

(58) Field of Classification Search
  CPC ............................ C01B 25/14; H01M 10/0562
  See application file for complete search history.

(56) References Cited

U.S. PATENT DOCUMENTS

| | | |
|---|---|---|
| 2015/0093652 A1 | 4/2015 | Aihara et al. |
| 2015/0333367 A1 | 11/2015 | Kato et al. |
| 2016/0248119 A1 | 8/2016 | Kato |
| 2020/0020977 A1* | 1/2020 | Katori ................. H01M 10/052 |

FOREIGN PATENT DOCUMENTS

| | | |
|---|---|---|
| CN | 107369828 A | 11/2017 |
| DE | 10 2015 107 399 A1 | 11/2015 |
| JP | 2015-232965 A | 12/2015 |
| JP | 2020-27780 A | 2/2020 |
| WO | 2018/173939 A1 | 9/2018 |

OTHER PUBLICATIONS

Kato, Y. et al., "High-power all-solid-state batteries using sulfide superionic conductors", Nature Energy 1, Article No. 16030, Mar. 21, 2016, pp. 1-7.

Hori, S. et al., "Structure-property relationships in lithium superionic conductors having a $Li_{10}GeP_2S_{12}$-type structure", Acta Cryst. Structure Science Crystal Engineering Materials. (2015). B71, pp. 727-736.

International Search Report issued in International Patent Application No. PCT/JP2020/007280, dated Apr. 21, 2020, along with an English translation thereof.

Written Opinion of the International Searching Authority issued in International Patent Application No. PCT/JP2020/007280, dated Apr. 21, 2020, along with an English translation thereof.

Extended European Search Report issued in the corresponding European patent Application No. 20765973.1 dated Mar. 23, 2022.

* cited by examiner

*Primary Examiner* — Yong L Chu
(74) *Attorney, Agent, or Firm* — GREENBLUM & BERNSTEIN, P.L.C.

(57) ABSTRACT

A method for producing a sulfide solid electrolyte includes: forming an Li—P—S homogeneous solution prepared by mixing Li2S and P2S5 with each other in an organic solvent so that the Li2S/P2S5 molar ratio is from 0.7 to 1.5; forming an Li—Si—S homogeneous solution, which contains prepared containing at least elemental lithium (Li), elemental silicon (Si) and elemental sulfur (S) in an organic solvent; mixing a homogeneous mixed solution prepared by mixing the Li—P—S homogeneous solution and the Li—Si—S homogeneous solution with each other; forming a slurry prepared by mixing the homogeneous mixed solution and Li2S with each other; drying a precursor obtained by removing the organic solvent from the slurry; and a heating a sulfide solid electrolyte obtained by heating the precursor at 200-700° C.

12 Claims, 2 Drawing Sheets

METHOD FOR PRODUCING SULFIDE SOLID ELECTROLYTE

TECHNICAL FIELD

The present invention relates to a method for producing a sulfide-based solid electrolyte.

BACKGROUND ART

Recently, a demand for lithium ion secondary batteries has been increased in applications including portable information terminals, portable electronic equipments, electric vehicles, hybrid electric vehicles and stationary power storage systems. However, currently, a flammable organic solvent is used as an electrolytic solution in lithium ion secondary batteries, and a strong exterior is required so that an organic solvent does not leak out. Further, for example, in the case of portable personal computers, it is necessary to employ a structure against a risk at the time when an electrolytic solution leaks out. Thus, there is a limitation on structures of devices.

Moreover, the range of applications thereof has been widened to movable bodies such as vehicles and aircrafts, and a high capacity is desired for stationary lithium ion secondary batteries. Under such circumstances, importance tends to be placed on safety more than before, and efforts are concentrated on the development of an all-solid-state lithium ion secondary battery in which none of toxic substances such as organic solvents is used.

For example, use of an oxide, phosphate compound, organic polymer, sulfide or the like as a solid electrolyte in an all-solid-state lithium ion secondary battery has been examined.

Among these solid electrolytes, the sulfide has characteristics that it has high ion conductivity and is relatively soft, and that it is easy to form the interface between solids. The sulfide is stable with respect to active materials and has been developed as a practical solid electrolyte.

It has been found that, among sulfide-based solid electrolytes, an Si-containing sulfide-based solid electrolyte provides satisfactory ion conductivity (Non-Patent Document 1, Non-Patent Document 2), and practical use thereof is highly expected.

For conventional Si-containing sulfide-based solid electrolytes, $SiS_2$, which is a sulfide of Si, is often used as a raw material. However, $SiS_2$ has high reactivity with the atmosphere and contains an oxygen-containing compound, and often contains Si that is an unreacted raw material, and therefore it is difficult to prepare $SiS_2$ not containing impurities.

Accordingly, in a method for producing a conventional Si-containing sulfide-based solid electrolyte, when using $SiS_2$, which tends to contain impurities, as a raw material, there is a problem that it is difficult to obtain a solid electrolyte providing stable performance.

PRIOR ART DOCUMENTS

Non-Patent Documents

Non-Patent Document 1: Acta Cryst. (2015). B71, 727-736
Non-Patent Document 2: Nature Energy 1, Article number: 16030 (2016)

SUMMARY OF THE INVENTION

Problems to be Solved by the Invention

Under the above-described circumstances, it has been desired to provide a method for producing a sulfide-based solid electrolyte with little impurities providing stable performance, which has excellent productivity.

Means for Solving the Problems

The present inventors diligently made researches in consideration of the above-described problems and obtained an unexpected finding that a sulfide-based solid electrolyte with little impurities that is stable can be produced by using, as a raw material, an Li—Si—S homogeneous solution which contains at least elemental lithium (Li), elemental silicon (Si) and elemental sulfur (S) in an organic solvent.

Specifically, the present invention is as described below.

<1> A method for producing a sulfide-based solid electrolyte, the method comprising:
a solution making step 1 in which $Li_2S$ and $P_2S_5$ are mixed with each other in an organic solvent so that the $Li_2S/P_2S_5$ molar ratio becomes from 0.7 to 1.5 to prepare an Li—P—S homogeneous solution;
a solution making step 2 in which an Li—Si—S homogeneous solution, which contains at least elemental lithium (Li), elemental silicon (Si) and elemental sulfur (S) in an organic solvent, is prepared;
a solution mixing step in which the Li—P—S homogeneous solution and the Li—Si—S homogeneous solution are mixed with each other to prepare a homogeneous mixed solution;
a slurry forming step in which the homogeneous mixed solution and $Li_2S$ are mixed with each other to prepare a slurry;
a drying step in which the organic solvent is removed from the slurry to obtain a precursor; and
a heat treatment step in which the precursor is heated at 200 to 700° C. to obtain a sulfide-based solid electrolyte.

<2> The method according to item <1>, wherein the solution making step 2 comprises adding $Li_2S$ and $SiS_2$ to the organic solvent to be mixed therewith to prepare the Li—Si—S homogeneous solution.

<3> The method according to item <1> or <2>, wherein the solution making step 2 comprises adding $Li_2S$ and $SiS_2$ to the organic solvent to be mixed therewith and filtering the mixture to prepare the Li—Si—S homogeneous solution.

<4> The method according to any one of items <1> to <3>, wherein the organic solvent in the solution making step 1 and the solution making step 2 is at least one selected from the group consisting of tetrahydrofuran, acetonitrile, ethyl acetate and methyl acetate.

<5> The method according to any one of items <1> to <4>, wherein the solution mixing step comprises further adding lithium halide to prepare the homogeneous mixed solution.

<6> A method for producing a sulfide-based solid electrolyte, the method comprising:
a slurry forming step 1 in which an $Li_3PS_4$-containing slurry is prepared;
a solution making step in which an Li—Si—S homogeneous solution, which contains at least elemental lithium (Li), elemental silicon (Si) and elemental sulfur (S) in an organic solvent, is prepared;

a slurry forming step 2 in which the $Li_3PS_4$-containing slurry and the Li—Si—S homogeneous solution are mixed with each other to prepare a mixed slurry;

a slurry forming step 3 in which the mixed slurry and $Li_2S$ are mixed with each other to prepare a slurry;

a drying step in which the organic solvent is removed from the slurry obtained in the slurry forming step 3 to obtain a precursor; and a heat treatment step in which the precursor is heated at 200 to 700° C. to obtain a sulfide-based solid electrolyte.

<7> The method according to item <6>, wherein the slurry forming step 1 comprises mixing $Li_2S$ and $P_2S_5$ with each other in an organic solvent so that the $Li_2S/P_2S_5$ molar ratio becomes from 0.7 to 1.5 to prepare an Li—P—S homogeneous solution and mixing the Li—P—S homogeneous solution and $Li_2S$ with each other to prepare an $Li_3PS_4$-containing slurry.

<8> The method according to item <6> or <7>, wherein the solution making step comprises adding $Li_2S$ and $SiS_2$ to the organic solvent to be mixed therewith to prepare the Li—Si—S homogeneous solution.

<9> The method according to any one of items <6> to <8>, wherein the solution making step comprises adding $Li_2S$ and $SiS_2$ to the organic solvent to be mixed therewith and filtering the mixture to prepare the Li—Si—S homogeneous solution.

<10> The method according to any one of items <6> to <9>, wherein the organic solvent in the solution making step is at least one selected from the group consisting of tetrahydrofuran, acetonitrile, ethyl acetate and methyl acetate.

<11> The method according to any one of items <6> to <10>, wherein the slurry forming step 2 comprises further adding lithium halide to prepare the mixed slurry.

<12> The method according to any one of items <1> to <11>, wherein the temperature in the drying step is 60 to 280° C.

<13> The method according to any one of items <1> to <12>, wherein the sulfide-based solid electrolyte contains an LGPS-based solid electrolyte and has peaks at at least $2\theta=20.18°\pm0.50°$, $20.44°\pm0.50°$, $26.96°\pm0.50°$ and $29.58°\pm0.50°$ in X-ray diffraction (CuKα: $\lambda=1.5405$ Å).

Advantageous Effect of the Invention

According to the present invention, it is possible to provide a method for producing a sulfide-based solid electrolyte with little impurities providing stable performance, which has excellent productivity. Further, according to the present invention, it is possible to provide a formed body obtained by heating and forming the sulfide-based solid electrolyte and an all-solid-state battery comprising the sulfide-based solid electrolyte. Moreover, this production method can be applied to mass production.

EMBODIMENTS FOR CARRYING OUT THE INVENTION

Hereinafter, the present invention will be described in detail. Note that materials, constitutions, etc. described below do not limit the present invention and can be modified variously within the range of the gist of the present invention.

The first embodiment of the present invention is a method for producing a sulfide-based solid electrolyte, the method including:

a solution making step 1 in which $Li_2S$ and $P_2S_5$ are mixed with each other in an organic solvent so that the $Li_2S/P_2S_5$ molar ratio becomes from 0.7 to 1.5 to prepare an Li—P—S homogeneous solution;

a solution making step 2 in which an Li—Si—S homogeneous solution, which contains at least elemental lithium (Li), elemental silicon (Si) and elemental sulfur (S) in an organic solvent, is prepared;

a solution mixing step in which the Li—P—S homogeneous solution and the Li—Si—S homogeneous solution are mixed with each other to prepare a homogeneous mixed solution;

a slurry forming step in which the homogeneous mixed solution and $Li_2S$ are mixed with each other to prepare a slurry;

a drying step in which the organic solvent is removed from the slurry to obtain a precursor; and a heat treatment step in which the precursor is heated at 200 to 700° C. to obtain a sulfide-based solid electrolyte.

In the present invention, the Li—P—S homogeneous solution is defined as a solution which contains at least elemental lithium (Li), elemental phosphorus (P) and elemental sulfur (S) in an organic solvent, wherein no undissolved substance is precipitated, and the Li—Si—S homogeneous solution is defined as a solution which contains at least elemental lithium (Li), elemental silicon (Si) and elemental sulfur (S) in an organic solvent, wherein no undissolved substance is precipitated.

<Solution Making Step 1>

The solution making step 1 is a step in which $Li_2S$ and $P_2S_5$ are mixed with each other in an organic solvent so that the $Li_2S/P_2S_5$ molar ratio becomes from 0.7 to 1.5 to prepare an Li—P—S homogeneous solution.

At the time of mixing in the solution making step 1, a substrate is dispersed to provide a slurry state, but soon a reaction occurs. There is no need to carry out special stirring operation for crushing particles, and it is sufficient when stirring power that can enable suspension and dispersion of the slurry is provided.

Regarding the reaction temperature in the solution making step 1, the reaction slowly proceeds even at room temperature, but heating can be performed for increasing the reaction rate. When heating is performed, it is sufficient when it is performed at a temperature that is the boiling point of the organic solvent or lower. The temperature varies depending on the organic solvent to be used, but is usually lower than 120° C. Heating can also be performed under the pressurized state using an autoclave or the like. However, when mixing is carried out at a high temperature (120° C. or higher), there is concern that a side reaction may proceed.

The reaction time in the solution making step 1 varies depending on the type of the organic solvent and the particle diameter and concentration of raw materials, but for example, by performing the reaction for 0.1 to 24 hours, the reaction is completed and a solution can be made.

The Li—P—S homogeneous solution is produced by mixing $Li_2S$ and $P_2S_5$ with each other in the organic solvent so that the $Li_2S/P_2S_5$ molar ratio becomes from 0.7 to 1.5 to cause a reaction. In this regard, the above-described molar ratio is preferably $Li_2S/P_2S_5=0.75$ to 1.4, and more preferably $Li_2S/P_2S_5=0.8$ to 1.35. When the $Li_2S/P_2S_5$ molar ratio is 0.7 to 1.5, a solution can be made from $Li_2S$ and $P_2S_5$ at room temperature. When the molar ratio is not within the above-described range, precipitation may occur.

This solution may contain unreacted $Li_2S$ and $P_2S_5$. Further, the solution may contain impurities derived from $Li_2S$ and $P_2S_5$. The impurities are scarcely dissolved in the solvent and most of them precipitate. For this reason, it is preferred to apply filtration or centrifugation to the obtained solution to remove the precipitate and separate the solution, thereby obtaining a high-purity Li—P—S homogeneous solution.

As $P_2S_5$, a synthesized product or commercially-available product can be used. The higher the purity of $P_2S_5$ is, the better it is because the amount of impurities mixed into the solid electrolyte becomes smaller. The smaller the particle diameter of $P_2S_5$ is, the better it is because a higher reaction rate is obtained. The particle diameter is preferably 10 nm to 100 μm, more preferably 100 nm to 30 μm, and particularly preferably 300 nm to 10 μm. The lower the content of moisture is, the better it is because mixing of moisture deteriorates the other raw materials and the precursor. The content is more preferably 300 ppm or less, and particularly preferably 50 ppm or less.

<Solution Making Step 2>

The solution making step 2 is a step in which an Li—Si—S homogeneous solution, which contains at least elemental lithium (Li), elemental silicon (Si) and elemental sulfur (S) in an organic solvent, is prepared. By using the Li—Si—S homogeneous solution, a sulfide-based solid electrolyte with little impurities, which has high ion conductivity, can be stably obtained. When using $SiS_2$ as a starting material, it is difficult to homogeneously disperse Si in a solid electrolyte at the time of synthesis. Further, $SiS_2$ has high reactivity with the atmosphere and often contains an oxygen-containing compound or Si that is an unreacted raw material. For such reasons, it is difficult to prepare $SiS_2$ not containing impurities. Further, it is difficult to remove these impurities from $SiS_2$.

Meanwhile, in the case of the Li—Si—S homogeneous solution, Si is easily dispersed homogeneously in the solid electrolyte at the time of synthesis and a side reaction is not easily caused because of little impurities. For this reason, it is considered that a sulfide-based solid electrolyte having high ion conductivity can be stably produced by using it.

It is preferred that the Li—Si—S homogeneous solution, in which Li, Si and S are dissolved, is provided by mixing $Li_2S$ and $SiS_2$ with each other in an organic solvent so that the $Li_2S/SiS_2$ molar ratio becomes from 0.3 to 1.0 to cause a reaction. In this regard, the above-described molar ratio is more preferably $Li_2S/SiS_2=0.35$ to 0.8, and particularly preferably $Li_2S/SiS_2=0.4$ to 0.7.

This solution may contain unreacted $Li_2S$ and $SiS_2$. Further, the solution may contain impurities derived from $Li_2S$ and $SiS_2$.

More preferably, the solution obtained is subjected to filtration or centrifugation to remove the precipitate and separate the solution, thereby obtaining the Li—Si—S homogeneous solution. The concentration of each element in the obtained homogeneous solution is analyzed by means of ICP. The Li/Si molar ratio is preferably from 0.6 to 2.0. In this regard, the above-described molar ratio is more preferably Li/Si=0.7 to 1.6, and particularly preferably Li/Si=0.8 to 1.4.

The precipitate can be removed by means of filtration or centrifugation. When performing filtration using a filter, the pore size of the filter is desirably 10 μm or less. The pore size is more preferably 5 μm or less, and particularly preferably 2 μm or less.

The precipitate obtained includes unreacted raw materials such as $Li_2S$ and $SiS_2$ and impurities derived from $SiS_2$. Examples of the impurities include oxygen-containing compounds of Si or $SiS_2$ and $SiO_2$.

As $Li_2S$, a synthesized product or commercially-available product can be used. The lower the content of moisture is, the better it is because mixing of moisture deteriorates the other raw materials and the precursor. The content is more preferably 300 ppm or less, and particularly preferably 50 ppm or less. The smaller the particle diameter of $Li_2S$ is, the better it is because a higher reaction rate is obtained. The particle diameter is preferably 10 nm to 100 μm, more preferably 100 nm to 30 μm, and particularly preferably 300 nm to 10 μm. Note that the particle diameter can be measured by means of SEM, a particle size distribution measurement apparatus utilizing laser scattering, or the like.

As $SiS_2$, a synthesized product or commercially-available product can be used. The higher the purity of $SiS_2$ is, the better it is because the amount of impurities mixed into the solid electrolyte becomes smaller. The smaller the particle diameter of $SiS_2$ is, the better it is because a higher reaction rate is obtained. The particle diameter is preferably 10 nm to 100 μm, more preferably 100 nm to 30 μm, and particularly preferably 300 nm to 10 μm. The particle diameter can be measured by means of SEM, a particle size distribution measurement apparatus utilizing laser scattering, or the like. Note that there is no problem even when a part of the above-described raw materials to be used are amorphous. The lower the content of moisture is, the better it is because mixing of moisture deteriorates the other raw materials and the precursor. The content is more preferably 300 ppm or less, and particularly preferably 50 ppm or less.

The organic solvent is not particularly limited as long as it does not react with $Li_2S$ or $SiS_2$. Examples thereof include an ether-based solvent, an ester-based solvent, a hydrocarbon-based solvent and a nitrile-based solvent. Specific examples thereof include tetrahydrofuran, cyclopentyl methyl ether, diisopropyl ether, diethyl ether, dimethyl ether, dioxane, methyl acetate, ethyl acetate, butyl acetate and acetonitrile. Among them, at least one selected from the group consisting of tetrahydrofuran, acetonitrile, ethyl acetate and methyl acetate is preferred, and acetonitrile is particularly preferred. For preventing deterioration of the raw material composition, it is preferred to remove oxygen and water in the organic solvent in advance. In particular, regarding the moisture content, it is preferably 100 ppm or less, and more preferably 50 ppm or less. As the organic solvent to be used in the solution making step 1, the same materials as above can be preferably used.

The total concentration of Li, Si and S in the organic solvent is preferably 0.5 to 20% by weight, more preferably 1 to 15% by weight, and particularly preferably 2 to 10% by weight. When the total concentration of Li, Si and S in the organic solvent is higher than 20% by weight, it is difficult to obtain a homogeneous solution because of precipitation of solids. Meanwhile, when the total concentration of Li, Si and S in the organic solvent is lower than 0.5% by weight, a large amount of the organic solvent must be used and a load of solvent recovery is increased. In addition, it causes excessive increase in the size of a reactor.

<Solution Mixing Step>

The solution mixing step is a step in which the Li—P—S homogeneous solution and the Li—Si—S homogeneous solution are mixed with each other to prepare a homogeneous mixed solution.

By adding the Li—P—S homogeneous solution to the Li—Si—S homogeneous solution, the homogeneous mixed solution can be prepared. Regarding the concentration of elements constituting the obtained homogeneous mixed solution, the P/Si molar ratio is preferably from 0.7 to 1.5. The molar ratio is more preferably P/Si=0.8 to 1.4, and particularly preferably P/Si=0.9 to 1.3. When the molar ratio is within the above-described range, a sulfide-based solid electrolyte exhibiting high ion conductivity tends to be obtained.

The type and concentration of elements can be confirmed, for example, by using an ICP emission spectrometer. Since performances of the sulfide-based solid electrolyte significantly change due to slight deviation of the composition, it is preferred that the elemental composition is accurately controlled by subjecting the homogeneous solution to ICP emission spectrometry.

Note that a halogen compound can be added thereto. In this case, it is preferred that the halogen compound is also dissolved in the organic solvent. Preferred specific examples of the halogen compound include LiCl, LiBr, LiI, $PCl_5$, $PCl_3$, $PBr_5$ and $PBr_3$, and more preferred are LiCl, LiBr and LiI. These materials may be used solely, or two or more of them may be used in combination.

<Slurry Forming Step>

The slurry forming step is a step in which the homogeneous mixed solution obtained in the solution mixing step and $Li_2S$ are mixed with each other to prepare a slurry.

As a mixing method, mixing using an ordinary stirring blade is sufficient. For the purpose of crushing particles of $Li_2S$ added, it is preferred to perform disintegration by means of stirring. Moreover, a homogenizer or an ultrasonic disperser may also be used.

Regarding the amount of $Li_2S$ to be additionally added to the homogeneous mixed solution, the ratio of the total amounts of the raw materials to be added to the system is preferably based on the molar ratio of $Li_2S:P_2S_5:SiS_2$=6.3:1:1.6. The molar ratio is preferably $Li_2S:P_2S_5:SiS_2$=5.67:1:1.33 to 8.71:1:2.86, more preferably $Li_2S:P_2S_5:SiS_2$=5.86:1:1.43 to 8.00:1:2.50, and particularly preferably $Li_2S:P_2S_5:SiS_2$=6.08:1:1.54 to 7.44:1:2.22. The elemental composition ratio varies depending on elements to be used and there is a composition in which halogen is contained, but a composition by which an LGPS crystal is formed is more preferred. As Si-containing LGPS-based solid electrolytes, for example, $Li_{9.54}Si_{1.74}P_{1.44}S_{11.7}Cl_{0.3}$, $Li_{10}(Si_{0.5}Ge_{0.5})P_2S_{12}$, $Li_{10}(Si_{0.5}Sn_{0.5})P_2S_{12}$, $Li_{10.35}Si_{1.35}P_{1.65}S_{12}$, $Li_{9.42}Si_{1.02}P_{2.1}S_{9.96}O_{2.04}$, etc. are known.

The LGPS type crystal structure has an octahedron O composed of elemental Li and elemental S, a tetrahedron $T_1$ composed of at least one element selected from the group consisting of P, Ge, Si and Sn and elemental S, and a tetrahedron $T_2$ composed of elemental P and elemental S ($PS_4^{3-}$ anion), wherein the tetrahedron $T_1$ and the octahedron O share an edge and the tetrahedron $T_2$ and the octahedron O share an apex. A solid electrolyte having the LGPS type crystal structure is more preferred because ion conductivity thereof is particularly high.

The solid electrolyte having the LGPS type crystal structure to be used in the present invention preferably has peaks at at least 2θ=20.18°±0.50°, 20.44°±0.50°, 26.96°±0.50° and 29.58°±0.50° in X-ray diffraction (CuKα: λ=1.5405 Å).

The mixing time after the additional addition of $Li_2S$ is preferably 0.1 to 24 hours, and more preferably 4 to 12 hours. Note that $Li_2S$ additionally added reacts with $Li_2S$—$P_2S_5$ in a solution state to produce $Li_3PS_4$, but when the reaction time is long, a large amount of $Li_3PS_4$ is produced and an impurity layer is produced in a final product.

The temperature at the time of mixing may be room temperature. Heating may be performed, but when the temperature is too high, there is concern that a side reaction may proceed. When heating is performed, it is sufficient when it is performed at a temperature that is equal to or lower than the boiling point of the organic solvent. The temperature varies depending on the organic solvent to be used, but is usually lower than 120° C.

Mixing in the slurry forming step is preferably performed under inert gas atmosphere. Examples of the inert gas include nitrogen, helium and argon, and particularly preferred is argon. By also removing oxygen and moisture in the inert gas, deterioration of the raw material composition can be suppressed. The concentration of each of oxygen and moisture in the inert gas is preferably 1000 ppm or less, more preferably 100 ppm or less, and particularly preferably 10 ppm or less.

<Drying Step>

The drying step is a step in which the obtained slurry is dried to remove the organic solvent, thereby obtaining a precursor. Drying is preferably carried out by means of heated-air drying or vacuum drying under inert gas atmosphere.

Figure 1:
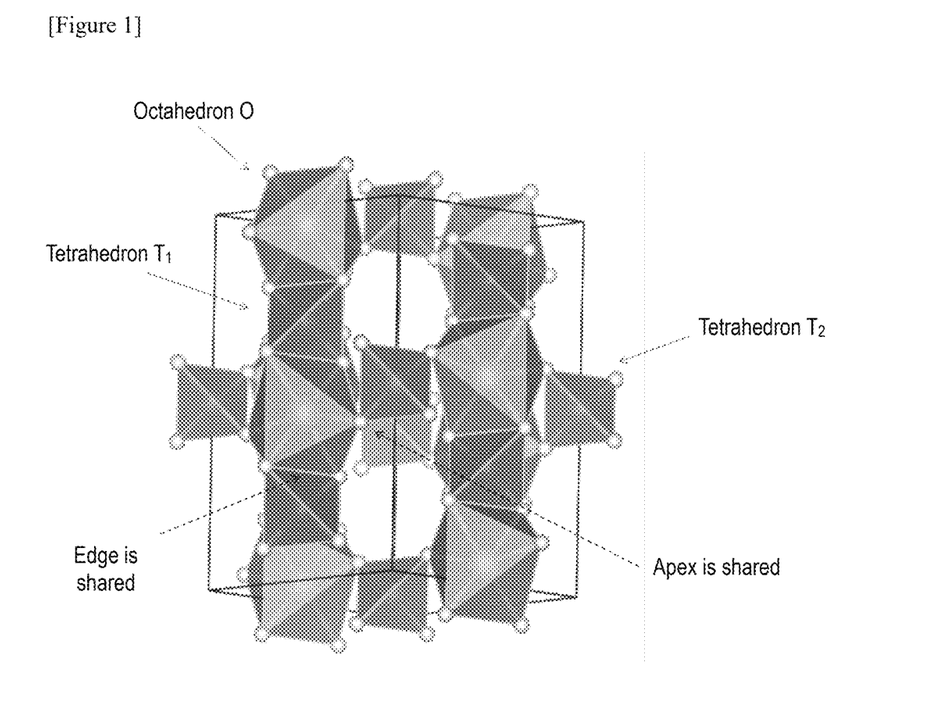
FIG. 1 is a schematic view showing a crystal structure of a sulfide-based solid electrolyte according to one embodiment of the present invention.
Figure 2:
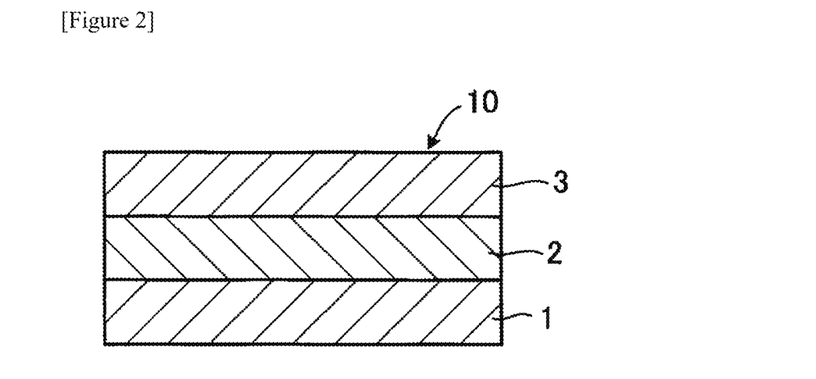
FIG. 2 is a schematic cross sectional view of an all-solid-state battery according to one embodiment of the present invention.

The drying temperature is preferably 60 to 280° C., and more preferably 100 to 250° C. The optimum temperature range slightly varies depending on the type of the organic solvent, but the temperature range is important. When the drying temperature is set to be too high in a state where the organic solvent exists, the quality of the precursor changes in almost all cases. Further, when the drying temperature is too low, the amount of the residual solvent is larger, and when the next heat treatment step is directly carried out, the organic solvent is carbonized and a sulfide-based solid electrolyte obtained has high electron conductivity. It may be preferred that the solid electrolyte has electron conductivity depending on the method for using it, but the solid electrolyte to be used for the portion 2 in FIG. 2 is required to have sufficiently low electron conductivity. In the case of using the solid electrolyte for such applications, the amount of the residual solvent must be decreased as much as possible.

The drying time slightly varies depending on the type of the organic solvent and the drying temperature, but the organic solvent can be sufficiently removed by drying for 1 to 24 hours. Note that by removing the organic solvent under reduced pressure as in the case of vacuum drying, and by flowing an inert gas such as nitrogen and argon in which the moisture content is sufficiently low, the temperature at the time of removing the organic solvent can be lowered and the required time can be shortened.

Note that the heat treatment step described below and the drying step can be carried out simultaneously.

<Heat Treatment Step>

The heat treatment step is a step in which the precursor obtained in the drying step is heated at 200 to 700° C. to obtain a sulfide-based solid electrolyte.

The heating temperature varies depending on the type, and in the case of a precursor containing Ge, Si or Sn, usually, the heating temperature is preferably 200 to 700° C., more preferably 350 to 650° C., and particularly preferably 400 to 600° C. When the temperature is lower than the above-described range, desired crystals are not easily generated, and when the temperature is higher than the above-described range, crystals other than those desired may be generated.

The heating time slightly varies depending on the heating temperature, but usually, crystallization can be sufficiently performed when the heating time is 0.1 to 24 hours. It is not preferred that heating is carried out at a high temperature for a long period of time which exceeds the above-described range because there is concern for change in quality of the sulfide-based solid electrolyte.

Heating can be performed under vacuum or inert gas atmosphere, but preferably performed under inert gas atmosphere. As the inert gas, nitrogen, helium, argon or the like can be used, and among them, argon is preferred. The contents of oxygen and moisture are preferably low, and conditions thereof are the same as those at the time of mixing in the slurry forming step.

The second embodiment of the present invention is a method for producing a sulfide-based solid electrolyte, the method including:

a slurry forming step 1 in which an $Li_3PS_4$-containing slurry is prepared;

a solution making step in which an Li—Si—S homogeneous solution, which contains at least elemental lithium (Li), elemental silicon (Si) and elemental sulfur (S) in an organic solvent, is prepared;

a slurry forming step 2 in which the $Li_3PS_4$-containing slurry and the Li—Si—S homogeneous solution are mixed with each other to prepare a mixed slurry;

a slurry forming step 3 in which the mixed slurry and $Li_2S$ are mixed with each other to prepare a slurry;

a drying step in which the organic solvent is removed from the slurry obtained in the slurry forming step 3 to obtain a precursor; and a heat treatment step in which the precursor is heated at 200 to 700° C. to obtain a sulfide-based solid electrolyte.

The slurry forming step 1 in the second embodiment is not particularly limited as long as the $Li_3PS_4$-containing slurry can be prepared thereby, but it is preferred to mix $Li_2S$ and $P_2S_5$ with each other in an organic solvent so that the $Li_2S/P_2S_5$ molar ratio becomes from 0.7 to 1.5 to prepare an Li—P—S homogeneous solution and to mix the Li—P—S homogeneous solution and $Li_2S$ with each other, thereby preparing the $Li_3PS_4$-containing slurry.

The other steps in the second embodiment can be carried out according to the steps explained with respect to the first embodiment.

Regarding the production method of this embodiment, it is sufficient when the Li—Si—S homogeneous solution is used, and a reaction apparatus and conditions are not particularly limited. As the method for producing the sulfide-based solid electrolyte from raw materials, for example, solid phase synthesis according to a mechanical milling method using a planetary ball mill, liquid phase synthesis in which a raw material composition is reacted in the presence of an organic solvent, melt mixing described in Japanese Patent No. 5187703, etc. can be employed.

The sulfide-based solid electrolyte of the present invention obtained in the above-described manner can be formed into a desired formed body by various means and can be used for various applications including an all-solid-state battery described below. The forming method is not particularly limited. For example, a method similar to the method for forming respective layers constituting the all-solid-state battery described in <All-solid-state battery> below can be used.

<All-Solid-State Battery>

The sulfide-based solid electrolyte of the present invention can be used, for example, as a solid electrolyte for all-solid-state batteries. Further, according to another embodiment of the present invention, an all-solid-state battery comprising the above-described solid electrolyte for all-solid-state batteries is provided.

In this regard, the "all-solid-state battery" is an all-solid-state lithium ion secondary battery. FIG. 2 is a schematic cross sectional view of an all-solid-state battery according to one embodiment of the present invention. An all-solid-state battery 10 has a structure in which a solid electrolyte layer 2 is arranged between a positive electrode layer 1 and a negative electrode layer 3. The all-solid-state battery 10 can be used in various devices including mobile phones, personal computers and automobiles.

The sulfide-based solid electrolyte of the present invention may be contained as a solid electrolyte in at least one of the positive electrode layer 1, the negative electrode layer 3 and the solid electrolyte layer 2. In the case where the sulfide-based solid electrolyte of the present invention is contained in the positive electrode layer 1 or negative electrode layer 3, the sulfide-based solid electrolyte of the present invention is used in combination with a publicly-known positive electrode active material or negative electrode active material for lithium ion secondary batteries. The quantitative ratio of the sulfide-based solid electrolyte of the present invention to be contained in the positive electrode layer 1 or negative electrode layer 3 is not particularly limited.

The sulfide-based solid electrolyte of the present invention may be used solely, or according to need, may be suitably used in combination with an oxide solid electrolyte (e.g., $Li_7La_3Zr_2O_{12}$), a sulfide-based solid electrolyte (e.g., $Li_2S$—$P_2S_5$), other complex hydride solid electrolytes (e.g., $LiBH_4$ and $3LiBH_4$—LiI), etc.

The all-solid-state battery is prepared by forming and layering the above-described layers, and the forming method and layering method for the respective layers are not particularly limited.

Examples thereof include: a method in which a solid electrolyte and/or an electrode active material are dispersed in a solvent to provide a slurry-like mixture, which is applied by a doctor blade, spin coating or the like and subjected to rolling to form a film; a gas phase method in which film forming and layering are performed by using a vacuum deposition method, ion plating method, sputtering method, laser ablation method or the like; and a pressing method in which powder is formed by hot pressing or cold pressing (not heating) and layering is performed.

Since the sulfide-based solid electrolyte of the present invention is relatively soft, it is particularly preferred to prepare the all-solid-state battery by forming the respective layers by means of the pressing method and layering the layers. As the pressing method, there are hot pressing in which heating is performed and cold pressing in which heating is not performed, but forming the layers can be sufficiently carried out even by means of cold pressing.

Note that the present invention includes a formed body obtained by heating and forming the sulfide-based solid electrolyte of the present invention. The formed body is suitably used as the all-solid-state battery. Further, the present invention includes a method for producing an all-solid-state battery, which includes a step of heating and forming the sulfide-based solid electrolyte of the present invention.

EXAMPLES

Hereinafter, the embodiments of the present invention will be more specifically described by way of examples, but the embodiments are not limited to the examples.

Example 1

<Solution Making Step 1>

In a glovebox under argon atmosphere, 152 mg of $Li_2S$ (manufactured by Sigma-Aldrich, purity: 99.8%) and 734 mg of $P_2S_5$ (manufactured by Sigma-Aldrich, purity: 99%) were weighed so that the molar ratio of $Li_2S:P_2S_5$ became 1:1. Next, to 8.0 g of acetonitrile (manufactured by Wako Pure Chemical Industries, Ltd., super dehydrated grade), $Li_2S$ and $P_2S_5$ were added in this order so that the concentration of ($Li_2S+P_2S_5$) became 10 wt %, and mixing was carried out at room temperature for 3 hours. The mixture was gradually dissolved, and an Li—P—S homogeneous solution was obtained.

<Solution Making Step 2>

In a glovebox under argon atmosphere, 4 g of $Li_2S$ (manufactured by Sigma-Aldrich, purity: 99.8%) and 16 g of $SiS_2$ (manufactured by Mitsuwa Chemicals Co., Ltd.) were weighed so that the molar ratio of $Li_2S:SiS_2$ became 0.5:1. Next, these materials were added to 610 g of acetonitrile (manufactured by Wako Pure Chemical Industries, Ltd., super dehydrated grade) so that the concentration of ($Li_2S+SiS_2$) became 3 wt %, and mixing was carried out at room temperature for 24 hours. The mixture was gradually dissolved, but at this stage, impurities in the raw materials remained.

The obtained solution was filtered with a membrane filter (PTFE, pore size: 1.0 µm), thereby obtaining 2.0 g of a filter residue and 578 g of a filtrate (Li—Si—S homogeneous solution). When the Li—Si—S homogeneous solution was subjected to ICP analysis, Li/Si (molar ratio) was 50.6/49.4. Further, the concentration of ($Li_2S+SiS_2$) was 3.07 wt %.

<Solution Mixing Step>

8.85 g of the Li—P—S homogeneous solution was mixed with 20.34 g of the Li—Si—S homogeneous solution so that the molar ratio of Si:P became 9:11, and stirring was carried out for 3 hours to prepare a homogeneous mixed solution.

<Slurry Forming Step>

To the obtained homogeneous mixed solution, 672 mg of $Li_2S$ was added while stirring so that the amount thereof became 6.27 times the molar quantity of $P_2S_5$, and mixing was carried out at room temperature for 12 hours to prepare a slurry. The series of operations was carried out in the glovebox under argon atmosphere. Regarding the molar ratio of all the raw materials added to the system, $Li_2S:P_2S_5:SiS_2$ was 6.27:1:1.64.

<Drying Step>

The obtained slurry was dried under vacuum at 180° C. for 4 hours to remove the solvent. Removal of the solvent was carried out while stirring the solution. After that, it was cooled to room temperature to obtain a precursor.

<Heat Treatment Step>

In the glovebox, the obtained precursor was put into a glass reaction tube, which was placed in an electric tube furnace in a manner such that the precursor was not exposed to atmosphere. Argon (G3 grade) was injected into the reaction tube, the temperature was increased to 550° C. over 3 hours, and then burning was carried out at 550° C. for 8 hours, thereby synthesizing $Li_{3.45}Si_{0.45}P_{0.55}S_4$ crystal.

Example 2

<Solution Making Step 1>

In a glovebox under argon atmosphere, 142 mg of $Li_2S$ (manufactured by Sigma-Aldrich, purity: 99.8%) and 687 mg of $P_2S_5$ (manufactured by Sigma-Aldrich, purity: 99%) were weighed so that the molar ratio of $Li_2S:P_2S_5$ became 1:1. Next, to 7.5 g of acetonitrile (manufactured by Wako Pure Chemical Industries, Ltd., super dehydrated grade), $Li_2S$ and $P_2S_5$ were added in this order so that the concentration of ($Li_2S+P_2S_5$) became 10 wt %, and mixing was carried out at room temperature for 3 hours. The mixture was gradually dissolved, and an Li—P—S homogeneous solution was obtained.

<Solution Making Step 2>

An Li—Si—S homogeneous solution was obtained in a manner similar to that in Example 1.

<Solution Mixing Step>

8.29 g of the Li—P—S homogeneous solution was mixed with 23.30 g of the Li—Si—S homogeneous solution so that the molar ratio of Si:P became 1:1 to prepare a homogeneous mixed solution. Further, to the obtained homogeneous mixed solution, 51.9 mg of LiCl (manufactured by Sigma-Aldrich, purity: 99.99%), wherein the amount thereof was 0.40 time the molar quantity of $P_2S_5$ in the homogeneous mixed solution, was added while stirring, and mixing was carried out at room temperature for 3 hours.

<Slurry Forming Step>

To the obtained homogeneous mixed solution, 627 mg of $Li_2S$ was added while stirring so that the amount thereof became 6.45 times the molar quantity of $P_2S_5$, and mixing was carried out at room temperature for 12 hours to prepare a slurry. The series of operations was carried out in the glovebox under argon atmosphere. Regarding the molar ratio of all the raw materials added to the system, $Li_2S:P_2S_5:SiS_2:LiCl$ was 6.45:1:2:0.40.

<Drying Step>

The obtained slurry was dried under vacuum at 180° C. for 4 hours to remove the solvent. Removal of the solvent was carried out while stirring the solution. After that, it was cooled to room temperature to obtain a precursor.

<Heat Treatment Step>

In the glovebox, the obtained precursor was put into a glass reaction tube, which was placed in an electric tube furnace in a manner such that the precursor was not exposed to atmosphere. Argon (G3 grade) was injected into the reaction tube, the temperature was increased to 475° C. over 3 hours, and then burning was carried out at 475° C. for 8 hours, thereby synthesizing $Li_{3.355}Si_{0.505}P_{0.505}S_{3.9}Cl_{0.1}$ crystal.

Example 3

<Slurry Forming Step 1>

In a glovebox under argon atmosphere, 142 mg of $Li_2S$ (manufactured by Sigma-Aldrich, purity: 99.8%) and 687 mg of $P_2S_5$ (manufactured by Sigma-Aldrich, purity: 99%) were weighed so that the molar ratio of $Li_2S:P_2S_5$ became 1:1. Next, to 7.5 g of acetonitrile (manufactured by Wako Pure Chemical Industries, Ltd., super dehydrated grade), $Li_2S$ and $P_2S_5$ were added in this order so that the concentration of ($Li_2S+P_2S_5$) became 10 wt %, and mixing was carried out at room temperature for 3 hours. The mixture was gradually dissolved, and an Li—P—S homogeneous solution was obtained. Next, $Li_2S$ was added in an amount of 2 times the molar quantity of $P_2S_5$, and stirring was carried out for 6 hours to cause precipitation of $Li_3PS_4$, thereby obtaining an $Li_3PS_4$-containing slurry.

<Solution Making Step>

An Li—Si—S homogeneous solution was obtained in a manner similar to that of the solution making step 2 in Example 1.

<Slurry Forming Step 2>

8.57 g of the $Li_3PS_4$-containing slurry was mixed with 23.30 g of the Li—Si—S homogeneous solution so that the molar ratio of Si:P became 1:1 to prepare a mixed slurry. Further, to the obtained mixed slurry, 51.9 mg of LiCl (manufactured by Sigma-Aldrich, purity: 99.99%), wherein the amount thereof was 0.40 time the molar quantity of $P_2S_5$ in the mixed slurry, was added while stirring, and mixing was carried out at room temperature for 3 hours.

<Slurry Forming Step 3>

To the obtained mixed slurry, 343 mg of $Li_2S$ was added while stirring so that the amount thereof became 6.45 times the molar quantity of $P_2S_5$, and mixing was carried out at room temperature for 12 hours to prepare a slurry. The series of operations was carried out in the glovebox under argon atmosphere. Regarding the molar ratio of all the raw materials added to the system, $Li_2S:P_2S_5:SiS_2:LiCl$ was 6.45:1:2:0.40.

<Drying Step>

The obtained slurry was dried under vacuum at 180° C. for 4 hours to remove the solvent. Removal of the solvent was carried out while stirring the solution. After that, it was cooled to room temperature to obtain a precursor.

<Heat Treatment Step>

In the glovebox, the obtained precursor was put into a glass reaction tube, which was placed in an electric tube furnace in a manner such that the precursor was not exposed to atmosphere. Argon (G3 grade) was injected into the reaction tube, the temperature was increased to 475° C. over 3 hours, and then burning was carried out at 475° C. for 8 hours, thereby synthesizing $Li_{3.355}Si_{0.505}P_{0.505}S_{3.9}Cl_{0.1}$ crystal.

Comparative Example 1

<Solution Making Step>

An Li—P—S homogeneous solution was obtained in a manner similar to that of the solution making step 1 in Example 1.

<Slurry Forming Step>

To the obtained Li—P—S homogeneous solution, 498 mg of $SiS_2$ (manufactured by Mitsuwa Chemicals Co., Ltd.) was added while stirring so that the amount thereof became 1.64 times the molar quantity of $P_2S_5$ in the Li—P—S homogeneous solution, and mixing was carried out at room temperature for 12 hours. Further, to the above-described homogeneous solution, 799 mg of $Li_2S$ was added while stirring so that the amount thereof became 6.27 times the molar quantity of $P_2S_5$ in the homogeneous solution, and mixing was carried out at room temperature for 24 hours to obtain a slurry. The series of operations was carried out in the glovebox under argon atmosphere. Regarding the molar ratio of all the raw materials added to the system, $Li_2S:P_2S_5:SiS_2$ was 6.27:1:1.64.

<Drying Step>

The obtained slurry was dried under vacuum at 180° C. for 2 hours to remove the solvent. Removal of the solvent was carried out while stirring the solution. After that, it was cooled to room temperature to obtain a precursor.

<Heat Treatment Step>

In the glovebox, the obtained precursor was put into a glass reaction tube, which was placed in an electric tube furnace in a manner such that the precursor was not exposed to atmosphere. Argon (G3 grade) was injected into the reaction tube, the temperature was increased to 550° C. over 3 hours, and then burning was carried out at 550° C. for 8 hours, thereby synthesizing $Li_{3.45}Si_{0.45}P_{0.55}S_4$ crystal.

<X-Ray Diffraction Measurement>

Powders of the sulfide-based solid electrolytes obtained in Examples 1-3 and Comparative Example 1 were subjected to the X-ray diffraction measurement under Ar atmosphere at room temperature (25° C.) ("X' Pert3 Powder" manufactured by PANalytical, CuKα: λ=1.5405 Å).

Figure 3:
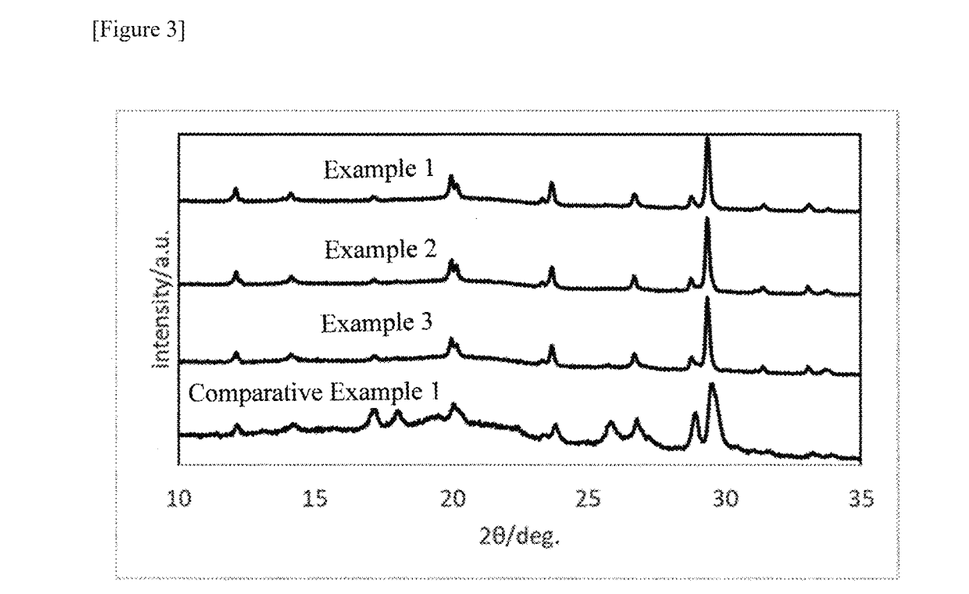
FIG. 3 is a graph showing the results of the X-ray diffraction measurement of the sulfide-based solid electrolytes obtained in Examples 1-3 and Comparative Example 1.

The results of the X-ray diffraction measurement of the sulfide-based solid electrolytes obtained in Examples 1-3 and Comparative Example 1 are shown in FIG. 3.

As shown in FIG. 3, in Examples 1-3, the diffraction peaks were observed at at least 2θ=20.18°±0.50°, 20.44°±0.50°, 26.96°±0.50° and 29.58°±0.50°, and the pattern corresponded to that of $Li_{10}GeP_2S_{12}$ of ICSD database.

<Lithium Ion Conductivity Measurement>

Each of the sulfide-based solid electrolytes obtained in Examples 1-3 and Comparative Example 1 was subjected to uniaxial molding (420 MPa) to obtain a disk having a thickness of about 1 mm and a diameter of 10 mm. Using a cell for evaluating all-solid-state batteries (manufactured by Hohsen Corporation), the AC impedance was measured by the four-terminal method utilizing an indium electrode at room temperature (25° C.) ("SI1260 IMPEDANCE/GAIN-PHASE ANALYZER" manufactured by Solartron), and the lithium ion conductivity was calculated.

Specifically, the sample was put into a thermostatic bath with its temperature being set at 25° C. and it was kept for 30 minutes, and after that, the lithium ion conductivity was measured. The measurement frequency range was 0.1 Hz to 1 MHz, and the amplitude was 50 mV. The measurement results of the lithium ion conductivity are shown in Table 1 below.

TABLE 1

| | Ion conductivity (S/cm) |
|---|---|
| Example 1 | 0.0054 |
| Example 2 | 0.0079 |
| Example 3 | 0.0060 |
| Comparative Example 1 | 0.0006 |

It was confirmed whether or not impurities in the filter residue and the filtrate (Li—Si—S homogeneous solution) obtained after filtration carried out in <Solution making step 2> of Example 1 were removed.

Regarding the filtrate, a portion of the Li—Si—S homogeneous solution obtained in <Solution making step 2> was collected and dried under vacuum at 200° C. for 2 hours to remove the solvent, thereby obtaining a white solid, and it was analyzed.

<SEM-EDX Measurement>

The obtained filter residue and white solid were subjected to the SEM-EDX measurement (scanning electron microscope "S-3400N" manufactured by Hitachi High-Technologies Corporation, acceleration voltage: 5.0 kV at the time of surface observation and 15.0 kV at the time of EDX) under vacuum conditions at room temperature (25° C.). The measurement results are shown in Table 2 and Table 3. As shown in Table 2 and Table 3, the amount of oxygen in the white solid that is a filtrate-dried product was smaller than that in the filter residue, and it is considered that an oxygen-containing compound was successfully removed by filtration.

TABLE 2

White solid obtained from Li—Si—S homogeneous solution (filtrate-dried product)

| Element | % by weight | % by number of atoms | Net intensity |
|---|---|---|---|
| Si | 25.0 | 26.0 | 2289.3 |
| S | 68.6 | 62.4 | 4098.7 |
| O | 6.4 | 11.7 | 138.6 |

TABLE 3

Filter residue

| Element | % by weight | % by number of atoms | Net intensity |
|---|---|---|---|
| Si | 31.9 | 23.9 | 2193.5 |
| S | 20.5 | 13.5 | 941.4 |
| O | 47.6 | 62.6 | 1257.7 |

<X-Ray Diffraction Measurement>

The obtained filter residue and white solid were subjected to the X-ray diffraction measurement under Ar atmosphere at room temperature (25° C.) ("X' Pert3 Powder" manufactured by PANalytical, CuKα: λ=1.5405 Å).

Figure 4:
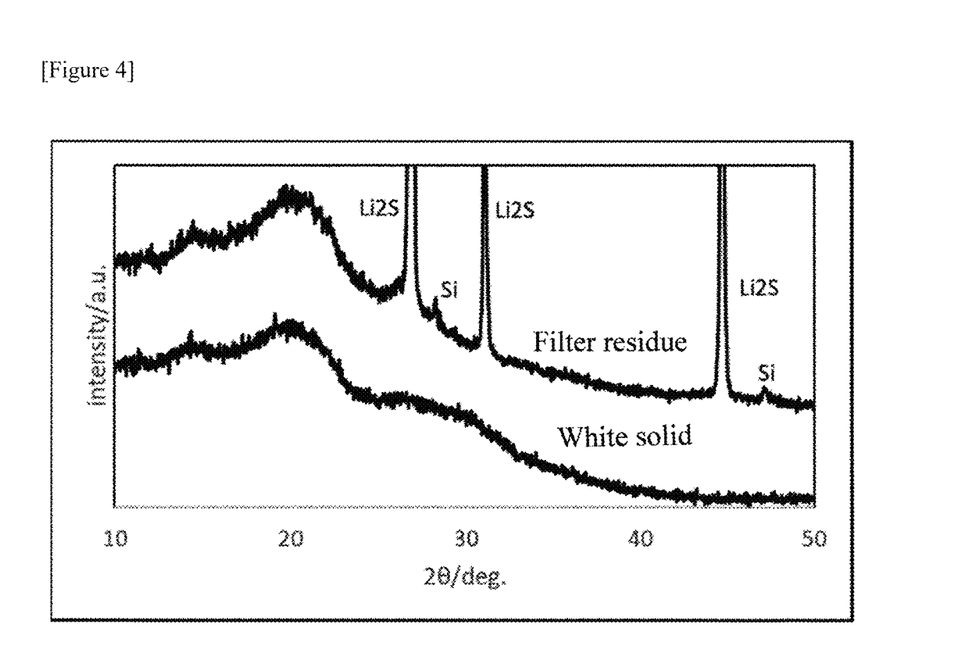
FIG. 4 is a graph showing the results of the X-ray diffraction measurement of the filter residue and the white solid obtained in <Solution making step 2> of Example 1.

The results of the X-ray diffraction measurement of the obtained filter residue and white solid are shown in FIG. 4. As shown in FIG. 4, in the case of the filter residue, peaks of metal Si as an impurity were observed. Meanwhile, in the case of the white solid obtained by drying the filtrate, peaks of impurities were not observed. Accordingly, it is considered that metal Si was successfully removed by filtration.

EXPLANATIONS OF LETTERS OR NUMERALS 1 positive electrode layer
2 solid electrolyte layer
3 negative electrode layer
10 all-solid-state battery

The invention claimed is:

1. A method for producing a sulfide-based solid electrolyte, the method comprising:
mixing $Li_2S$ and $P_2S_5$ with each other in an organic solvent so that the $Li_2S/P_2S_5$ molar ratio becomes from 0.7 to 1.5 to prepare an Li—P—S homogeneous solution;
preparing an Li—Si—S homogeneous solution, which contains at least elemental lithium (Li), elemental silicon (Si) and elemental sulfur(S) in an organic solvent, wherein the preparing of the Li—Si—S homogeneous solution comprises adding $Li_2S$ and $SiS_2$ to the organic solvent to be mixed therewith to prepare the Li—Si—S homogeneous solution;
mixing the Li—P—S homogeneous solution and the Li—Si—S homogeneous solution with each other to prepare a homogeneous mixed solution;
mixing the homogeneous mixed solution and $Li_2S$ with each other to prepare a slurry;
removing the organic solvent from the slurry to obtain a precursor; and
heating the precursor at 200 to 700° C. to obtain a sulfide-based solid electrolyte.

2. The method according to claim 1, wherein the preparing of the Li—Si—S homogeneous solution comprises adding $Li_2S$ and $SiS_2$ to the organic solvent to be mixed therewith and filtering the mixture to prepare the Li—Si—S homogeneous solution.

3. The method according to claim 1, wherein the organic solvent during the mixing of the $Li_2S$ and $P_2S_5$ with each other in the organic solvent and the preparing of the Li—Si—S homogeneous solution is at least one selected from the group consisting of tetrahydrofuran, acetonitrile, ethyl acetate and methyl acetate.

4. The method according to claim 1, wherein the mixing of the Li—P—S homogeneous solution and the Li—Si—S homogeneous solution with each other comprises further adding lithium halide to prepare the homogeneous mixed solution.

5. A method for producing a sulfide-based solid electrolyte, the method comprising:
preparing an $Li_3PS_4$-containing slurry, wherein the preparing of the $Li_3PS_4$-containing slurry comprises mixing $Li_2S$ and $P_2S_5$ with each other in an organic solvent so that the $Li_2S/P_2S_5$ molar ratio becomes from 0.7 to 1.5 to prepare an Li—P—S homogeneous solution and mixing the Li—P—S homogeneous solution and $Li_2S$ with each other to prepare an $Li_3PS_4$-containing slurry;
preparing an Li—Si—S homogeneous solution, which contains at least elemental lithium (Li), elemental silicon (Si) and elemental sulfur(S) in an organic solvent, wherein the preparing of the Li—Si—S homogeneous solution comprises adding $Li_2S$ and $SiS_2$ to the organic solvent to be mixed therewith to prepare the Li—Si—S homogeneous solution;
mixing the $Li_3PS_4$-containing slurry and the Li—Si—S homogeneous solution with each other to prepare a mixed slurry;
mixing the mixed slurry and $Li_2S$ with each other to prepare a slurry;
removing the organic solvent from the slurry obtained during the mixing of the mixed slurry and $Li_2S$ with each other to obtain a precursor; and
heating the precursor at 200 to 700° C. to obtain a sulfide-based solid electrolyte.

6. The method according to claim 5, wherein the preparing of the Li—Si—S homogeneous solution comprises adding $Li_2S$ and $SiS_2$ to the organic solvent to be mixed therewith and filtering the mixture to prepare the Li—Si—S homogeneous solution.

7. The method according to claim 5, wherein the organic solvent during the preparing of the Li—Si—S homogeneous solution is at least one selected from the group consisting of tetrahydrofuran, acetonitrile, ethyl acetate and methyl acetate.

8. The method according to claim 5, wherein the mixing of the $Li_3PS_4$-containing slurry and the Li—Si—S homogeneous solution with each other comprises further adding lithium halide to prepare the mixed slurry.

9. The method according to claim 1, wherein the temperature during the drying is 60 to 280° C.

10. The method according to claim 1, wherein the sulfide-based solid electrolyte contains an LGPS-based solid electrolyte and has peaks at at least $2\theta=20.18°\pm0.50°$, $20.44°\pm0.50°$, $26.96°\pm0.50°$ and $29.58°+0.50°$ in X-ray diffraction (CuKα: $\lambda=1.5405$ Å).

11. The method according to claim 5, wherein the temperature in the drying step is 60 to 280° C.

12. The method according to claim 5, wherein the sulfide-based solid electrolyte contains an LGPS-based solid electrolyte and has peaks at at least $2\theta=20.18°\pm0.50°$, $20.44°\pm0.50°$, $26.96°\pm0.50°$ and $29.58°\pm0.50°$ in X-ray diffraction (CuKα: $\lambda=1.5405$ Å).

* * * * *